United States Patent
Oya et al.

(10) Patent No.: US 9,523,009 B2
(45) Date of Patent: Dec. 20, 2016

(54) ALCOHOL-BASED PRINTING INK COMPOSITION

(75) Inventors: Toru Oya, Tokyo (JP); Harunori Narihiro, Tokyo (JP); Takefumi Nomura, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 620 days.

(21) Appl. No.: 13/976,742

(22) PCT Filed: Dec. 27, 2011

(86) PCT No.: PCT/JP2011/080293
§ 371 (c)(1),
(2), (4) Date: Jun. 27, 2013

(87) PCT Pub. No.: WO2012/091050
PCT Pub. Date: Jul. 5, 2012

(65) Prior Publication Data
US 2013/0289185 A1  Oct. 31, 2013

(30) Foreign Application Priority Data
Dec. 27, 2010  (JP) .................................. 2010-289065

(51) Int. Cl.
*C09D 11/102* (2014.01)
*C09D 11/033* (2014.01)

(52) U.S. Cl.
CPC ........... *C09D 11/102* (2013.01); *C09D 11/033* (2013.01)

(58) Field of Classification Search
CPC .................................................. C09D 11/102
USPC .................................. 523/160, 161; 524/389
See application file for complete search history.

(56) References Cited

U.S. PATENT DOCUMENTS 6,406,143 B1 * 6/2002 Chen .................... C09D 11/326
347/105
2009/0246484 A1  10/2009 Kumagai et al.
2010/0022662 A1  1/2010 Goebelt et al.
2010/0233368 A1 * 9/2010 Zhu ........................ C09D 11/36
427/256
2010/0255317 A1 * 10/2010 Saito .................. C08G 18/0895
428/425.5

FOREIGN PATENT DOCUMENTS

| CN | 101842406 A | 9/2010 |
|---|---|---|
| JP | 6-100817 | 4/1994 |
| JP | 9-328646 | 12/1997 |
| JP | 2002 121250 | 4/2002 |
| JP | 2002 293860 | 10/2002 |
| JP | 2009-173862 | * 8/2009 |
| JP | 2010 53194 | 3/2010 |
| JP | 2010 514863 | 5/2010 |
| JP | 2010-144075 | 7/2010 |
| JP | 2010 241924 | 10/2010 |
| WO | 2012 008339 | 1/2012 |

OTHER PUBLICATIONS

Machine translation of JP 2009-173862.*
Combined Chinese Office Action and Search Report issued Mar. 26, 2014 in Patent Application No. 201180062980.2 (with English language translation).
Combined Chinese Office Action and Search Report issued Sep. 6, 2015 in Patent Application No. 201380033811.5 (with English language translation).
Office Action with Search Report issued Dec. 31, 2015 in Canadian Patent Application No. 2,877,846.
Combined Office Action and Search Report issued Feb. 4, 2016 in Chinese Patent Application No. 201380033811.5 (with English translation).
International Preliminary Report on Patentability and Written Opinion issued Jul. 11, 2013, in PCT/JP2011/080293 filed Dec. 27, 2011 (submitting English translation only).
International Search Report Issued Apr. 3, 2012 in PCT/JP11/80293 filed Dec. 27, 2011.
Office Action issued Jun. 30, 2016 in U.S. Appl. No. 14/411,337, filed Dec. 24, 2014.

* cited by examiner

*Primary Examiner* — Doris Lee
(74) *Attorney, Agent, or Firm* — Oblon, McClelland, Maier & Neustadt, L.L.P.

(57) ABSTRACT

An alcohol-based printing ink composition comprising: a polyurethane urea resin (D) that is obtained by a reaction of polyol (A), diisocyanate (B), and a chain extender (C); a coloring agent (E); and a medium comprising an alcohol (F) and water, wherein the polyol (A) contains polyether polyol (A1) and polyester polyol (A2), and the medium comprises 75% by weight or more of alcohol (F).

8 Claims, No Drawings

ALCOHOL-BASED PRINTING INK COMPOSITION

TECHNICAL FIELD

The present invention relates to an alcohol-based printing ink composition.

BACKGROUND ART

In recent years, in consideration of strengthening of legal regulation and environmental protection or safety, a printing ink not containing the toluene that has been suitably used as a conventional solvent of printing ink, and further minimizing a ketone solvent and an ester solvent as possible has been demanded increasingly. As such a solvent, an alcohol solvent has received a lot of attention. In particular, it is desired that the bio-ethanol having lower environmental impact is effectively used. In Patent Document 1, there is a disclosure of the dispersion of titanium white, in which as a solvent, ethanol is used as the main component.

However, in the case of a printing ink in which alcohol is used as the main solvent, a binder resin is required to be alcohol solubilized, that is, hydrophilized. Titanium white having hydrophilic particle surface and hydrophilized binder resin have compatibility with each other. However, in an organic pigment having hydrophobic surface such as a copper phthalocyanine indigo blue pigment, the compatibility with a hydrophilized binder resin is deteriorated, as a result, a problem that the dispersion stability of pigment cannot be ensured was caused.

CITATION LIST

Patent Documents
Patent Document 1: Japanese Patent Application Laid-Open No. 2002-293860

SUMMARY OF INVENTION

Technical Problem

An object of the present invention is to provide a printing ink in which alcohol is contained as a medium, and the pigment dispersibility and the storage stability are excellent, and further the coating property such as adhesion and blocking resistance is excellent.

Means to Solve the Problem

The first aspect relates to an alcohol-based printing ink composition containing: a polyurethane urea resin (D) that is obtained by a reaction of polyol (A), diisocyanate (B), and a chain extender (C); a coloring agent (E); and alcohol (F) and water as a medium,
wherein the polyol (A) contains polyether polyol (A1) and polyester polyol (A2), and
in 100% by weight of the medium in total, the ratio of alcohol (F) is 75% by weight or more.

Further, the second aspect relates to the alcohol-based printing ink composition of the first aspect, wherein the polyester polyol (A2) is castor oil polyol.

Furthermore, the third aspect relates to the alcohol-based printing ink composition of the first or the second aspect, wherein a comb-type dispersant (H) having a styrene skeleton in the main chain thereof, and a polyalkylene oxide chain (G) in the side chain thereof is contained.

Still further, the forth aspect relates to the alcohol-based printing ink composition of the third aspect, wherein the polyalkylene oxide chain (G) has a structure containing a propylene oxide unit and/or an ethylene oxide unit that are represented by the following general formula (1).

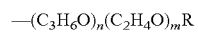  General formula (1)

(in the formula, R is H, or a hydrocarbon group having 1 to 4 carbon atoms, and each of n and m is an integer of 0 to 50 [provided that n and m are 9 to 50 in total]).

Still furthermore, the fifth aspect relates to the alcohol-based printing ink composition of the forth aspect, wherein in general formula (1), the ratio of the number of repetition of the propylene oxide unit, n and the number of repetition of the ethylene oxide unit, m, is n:m=100:0 to 75:25.

Further, the sixth aspect relates to the alcohol-based printing ink composition of any one of the first to fifth aspects, wherein the medium consists of only water and alcohol (F).

Furthermore, the seventh aspect relates to the alcohol-based printing ink composition of any one of the first to sixth aspects, wherein in 100% by weight of the alcohol (F) in total, the ratio of ethanol and/or isopropanol can be 70% by weight or more.

Still further, the eighth aspect relates to the alcohol-based printing ink composition of any one of the first to seventh aspects, wherein in 100% by weight of the medium in total, the ratio of water is 2 to 20% by weight.

The subject of the present invention incorporates Japanese Patent Application No. 2010-289065 filed on Dec. 27, 2010 herein totally for reference.

Advantageous Effects of Invention

According to the present invention, a printing ink in which alcohol is contained as a medium, and the pigment dispersibility and the storage stability are excellent, and further the coating property such as adhesion and blocking resistance is excellent, can be provided.

DESCRIPTION OF EMBODIMENTS

Hereinafter, the embodiments of the present invention will be explained in detail, however, the explanation of the configuration requirements described below is an example of the embodiments of the present invention (a representative example), and the present invention is not specified to the content thereof as long as not exceeding the gist thereof.

The alcohol-based printing ink composition of the present invention contains a polyurethane urea resin (D) that is obtained by a reaction of polyol (A), diisocyanate (B), and a chain extender (C); a coloring agent (E); and alcohol (F) and water as a medium, in which the polyol (A) contains polyether polyol (A1) and polyester polyol (A2), and in 100% by weight of the medium in total, a ratio of alcohol (F) is 75% by weight or more.

First, polyol (A) is explained.

Polyol (A) contains polyether polyol (A1) and polyester polyol (A2).

As the polyether polyol (A1), the polyether polyol (A1) is not limited to the following examples, however, examples of the polyether polyol (A1) include polyethylene glycol, polypropylene glycol, polyoxytetramethylene glycol, and the copolymerized polyether diol thereof.

The polyether polyol (A1) is used for the purpose of imparting alcohol solubility to a polyurethane urea resin (D). The used amount of polyether polyol (A1) is, from the viewpoints of the dispersion stability of pigment and the blocking resistance in printed materials, preferably in the range of 25 to 85% by weight, and more preferably in the range of 35 to 75% by weight in 100% by weight of the polyol (A) in total.

As the molecular weight of polyether polyol (A1), the weight average molecular weight is preferably in the range of 500 to 4000, and more preferably in the range of 1000 to 3000. When the weight average molecular weight is 4000 or less, the dispersion stability of pigment and the blocking resistance in printed materials are favorable, and when the weight average molecular weight is 500 or more, the substrate adhesion in printed materials is favorable.

The polyester polyol (A2) is not limited to the following examples, however, examples of the polyester polyol (A2) include a polyester diol such as a condensate obtained by an esterification reaction of dibasic acid and diol, a caprolactone polymer, a valerolactone polymer, a methyl valerolactone polymer, a lactic acid polymer, and a castor oil fatty acid polymer, which are obtained by using the diol as an initiator.

The dibasic acid is not limited to the following examples, however, examples of the dibasic acid include adipic acid, phthalic anhydride, isophthalic acid, terephthalic acid, maleic acid, fumaric acid, succinic acid, oxalic acid, malonic acid, pimelic acid, azelaic acid, sebacic acid, suberic acid, glutaric acid, 1,4-cyclohexyl dicarboxylic acid, dimer acid, and hydrogenated dimer acid.

The diol is not limited to the following examples, however, examples of the diol include ethylene glycol, diethylene glycol, triethylene glycol, propylene glycol, 1,3-propanediol, 1,4-butanediol, 1,3-butanediol, 1,6-hexanediol, 1,8-octanediol, 1,9-nonanediol, neopentylglycol, 3-methyl-1,5-pentanediol, 2-methyl-1,3-propanediol, 3,3,5-trimethyl pentanediol, 2,4-diethyl-1,5-pentanediol, 1,12-octadecanediol, 1,2-alkanediol, 1,3-alkanediol, 1-monoglyceride, 2-monoglyceride, 1-monoglycerin ether, 2-monoglycerin ether, dimer diol, and hydrogenated dimer diol.

Among them, as the polyester polyol (A2), castor oil polyol such as a castor oil fatty acid polymer is particularly preferred in terms of the dispersion stability of pigment, the storage stability of the obtained ink, and the transparency in printed materials. The polyester polyol (A2) can be used alone, or by mixing 2 kinds or more thereof.

The polyester polyol (A2) is used for the purpose of imparting the dispersion stability of pigment in alcohol (F) to a polyurethane urea resin (D). The used amount of polyester polyol (A2) is, from the viewpoints of the solubility in alcohol (F) and the favorable pigment dispersibility of polyurethane urea resin (D), preferably in the range of 15 to 75% by weight, and more preferably in the range of 25 to 65% by weight in 100% by weight of the polyol (A) in total.

As the molecular weight of polyester polyol (A2), the weight average molecular weight is preferably in the range of 500 to 3500, and more preferably in the range of 1000 to 3000. When the weight average molecular weight is 3500 or less, the solubility of polyurethane urea resin (D) in alcohol (F) is favorable, and when the weight average molecular weight is 500 or more, the substrate adhesion in printed materials is favorable.

Further, as the polyol (A) of the present invention, in addition to polyether polyol (A1) and polyester polyol (A2), known polyol can be used in combination. Such polyol is not limited to the following examples, however, for example, a high molecular diol such as a polycarbonate diol, and further a low molecular diol such as ethylene glycol, diethylene glycol, triethylene glycol, propylene glycol, 1,3-propanediol, 1,4-butanediol, 1,3-butanediol, 1,6-hexanediol, 1,8-octanediol, 1,9-nonanediol, and hydrogenated bisphenol A can be used.

Herein, the low molecular diol means a diol that does not have a repeating unit in the structure thereof.

The used amount of low molecular diol is preferably 20% by weight or less, and more preferably 10% by weight or less in 100% by weight of the polyol (A). When the used amount of low molecular diol is 20% by weight or less, the substrate adhesion in printed materials is favorable.

Next, diisocyanate (B) is explained.

Diisocyanate (B) is not limited to the following examples, however, examples of the diisocyanate (B) include aromatic diisocyanate, aliphatic diisocyanate, and alicyclic diisocyanate. For example, 1,5-naphthylene diisocyanate, 4,4'-diphenylmethane diisocyanate(another name: MDI), 4,4'-diphenyl dimethyl methane diisocyanate, 4,4'-dibenzyl isocyanate, dialkyl diphenylmethane diisocyanate, tetraalkyl diphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, methylene diisocyanate, 2,2,4-trimethyl hexamethylene diisocyanate, lysine diisocyanate, cyclohexane-1,4-diisocyanate , xylylene diisocyanate, isophorone diisocyanate, dicyclohexylmethane-4,4'-diisocyanate, 1,3-bis (isocyanate methyl)cyclohexane, methyl cyclohexane diisocyanate, norbornane diisocyanate, m-tetramethyl xylylene diisocyanate, 4,4-diphenylmethane diisocyanate, tolylene diisocyanate, bis-chloromethyl-diphenylmethane-diisocyanate , 2,6-diisocyanate-benzyl chloride, dimer diisocyanate in which a carboxyl group of dimer acid is converted to an isocyanate group, and the like are included. These diisocyanate compounds can be used alone, or by mixing 2 kinds or more thereof. Among them, from the viewpoint of the alcohol solubility of the polyurethane urea resin (D), alicyclic isocyanate such as isophorone diisocyanate is preferred.

Next, a chain extender (C) is explained.

A chain extender (C) is not particularly limited, however, diamines can be included. The diamines are not limited to the following examples, however, for example, ethylenediamine, propylenediamine, hexamethylenediamine, diethylenetriamine, triethylenetetramine, isophoronediamine, dicyclohexylmethane-4,4'-diamine, dimer diamine in which a carboxyl group of dimer acid is converted to an amino group; and further amines having a hydroxyl group in the molecule thereof, such as N-(2-hydroxyethyl)ethylenediamine, N-(2-hydroxyethyl)propylenediamine, N-(2-hydroxypropyl)ethylenediamine, N-(2-hydroxypropyl)propylenediamine, N,N'-bis(2-hydroxyethyl)ethylenediamine, N,N'-bis(2-hydroxyethyl) propylenediamine, N,N'-bis(2-hydroxypropyl) ethylenediamine, and N,N'-bis(2-hydroxypropyl) propylenediamine; and also amines having a tertiary amino group in the molecule thereof, such as methyliminobispropylamine, and laurylimi-nobispropylamine, can be used. These chain extenders can also be used alone, or by mixing 2 kinds or more thereof.

Next, a polyurethane urea resin (D) is explained.

As a method for producing a polyurethane urea resin (D), the method is not particularly limited, and a common method for producing a polyurethane urea resin can be used. For example, firstly, without a solvent, polyol (A) and diisocyanate (B) are reacted with each other at an equivalent ratio at which the isocyanate group is excessive relative to the hydroxyl group, a prepolymer containing an isocyanate group is prepared. Next, the prepolymer is dissolved in alcohol (F), preferably in alcohol having a tertiary hydroxyl group, to prepare a prepolymer solution. After that, into a solution in which a chain extender (C) is dissolved in alcohol (F), the prepolymer solution containing the isocyanate group is added to cause a chain extension reaction.

When the prepolymer is produced, the ratio of polyol (A) and diisocyanate (B) is preferably 1.1 to 3.0, and more preferably 1.5 to 2.5, in terms of NCO/OH, that is, a ratio of the mole number of the isocyanate group of diisocyanate (B) and the mole number of the hydroxyl group of polyol (A). When the ratio is 1.1 or more, the urea group concentration in the polyurethane urea resin to be obtained is high, therefore, the elastic modulus is high, and the sufficient blocking resistance in printed materials can be obtained. Further, when the NCO/OH ratio is 3.0 or less, the substrate adhesion in printed materials is favorable.

The weight average molecular weight of polyurethane urea resin (D) is preferably in the range of 10,000 to 100,000, and more preferably in the range of 15,000 to 50,000. When the weight average molecular weight is 10,000 or more, the blocking resistance in printed materials is sufficiently ensured, and when the weight average molecular weight is 100,000 or less, the solubility in alcohol (F) in the present invention is favorable, therefore, sufficient pigment dispersibility can be obtained.

Further, the polyurethane urea resin (D) preferably contains an amino group at the terminal and/or in the main chain thereof in order to ensure the adhesion to a substrate.

As the amount of the amino group to be contained, the amine value is preferably in the range of 0.5 to 40.0 mgKOH/g resin, and more preferably the amine value is in the range of 3.0 to 20.0 mgKOH/g resin. When the amine value is 0.5 mgKOH/g resin or more, the adhesion to a polyolefin-based film in printed materials is favorable, and when the amine value is 40.0 mgKOH/g resin or less, the storage stability of ink is favorable.

The polyurethane urea resin (D) is contained at a ratio of preferably 1 to 30% by weight, and more preferably 3 to 15% by weight, relative to the total weight of printing ink.

Next, a coloring agent (E) is explained.

As a coloring agent (E), for example, various types of agents that are used in usual ink, such as an organic pigment, an inorganic pigment, and a dye can be used.

The alcohol-based printing ink composition of the present invention has excellent pigment dispersibility not only in case of the inorganic pigment but also in case of the organic pigment, although alcohol is used as the main component of the medium.

The organic pigment is not limited to the following examples, however, examples of the organic pigment include Carmine 6B, Lake Red C, Permanent Red 2B, Disazo Yellow, Pyrazolone Orange, Carmine FB, Cromophtal Yellow, Cromophtal Red, Phthalocyanine Blue, Phthalocyanine Green, Dioxazine Violet, Quinacridone Magenta, Quinacridone Red, Indanthrone Blue, Pyrimidine Yellow, Thioindigo Bordeaux, Thioindigo Magenta, Perylene Red, Perinone Orange, Isoindolinone Yellow, Aniline Black, Diketopyrrolopyrrole Red, and Daylight Fluorescent Pigment.

The inorganic pigment is not limited to the following examples, however, examples of the inorganic pigment include carbon back, aluminum powder, bronze powder, chrome vermilion, chrome yellow, cadmium yellow, cadmium red, ultramarine blue, Prussian blue, red iron oxide, yellow iron oxide, iron black, titanium oxide, and zinc oxide.

The dye is not limited to the following examples, however, examples of the dye include Tartrazine Lake, Rhodan 6G Lake, Victoria Pure Blue Lake, Alkali Blue G Toner, and Brilliant Green Lake, and further, coal tar and the like can be used.

Among them, from the viewpoints of the water resistance and the like, an organic pigment or an inorganic pigment is preferably used.

The coloring agent (E) is contained in an amount sufficient to ensure the concentration and coloring power of the printing ink, that is, relative to the total weight of printing ink, at a ratio of preferably 1 to 50% by weight, and more preferably 5 to 40% by weight. Further, these coloring agents can be used alone, or by mixing 2 kinds or more thereof in combination.

Next, alcohol (F) is explained.

The alcohol-based printing ink composition of the present invention contains 75% by weight or more, preferably 84 to 98% by weight of alcohol (F), in 100% by weight of the medium in total. When the ratio of alcohol (F) is 75% by weight or more, the dispersion stability of pigment is favorable.

Alcohol (F) is not limited to the following examples, however, examples of the alcohol (F) include aliphatic alcohols having 1 to 7 carbon atoms such as methanol, ethanol, n-propanol, isopropanol, n-butanol, isobutanol, and tertiary-butanol; and further glycol monoethers such as propylene glycol monomethyl ether, propylene glycol monoethyl ether, propylene glycol monopropyl ether, propylene glycol monoisopropyl ether, and propylene glycol monobutyl ether. Among them, from the viewpoints of the lower environmental impact and the higher volatilization rate, ethanol and/or isopropanol can be preferably used. Further, in 100% by weight of the alcohol (F) in total, the ratio of ethanol and/or isopropanol can be particularly preferably 70% by weight or more. These alcohols (F) can be used alone, or by mixing 2 kinds or more thereof.

Next, water in a medium is explained.

The alcohol-based printing ink composition of the present invention contains water as a medium. The amount of water contained in a medium is preferably in the range of 2 to 20% by weight, and more preferably 4 to 16% by weight, in 100% by weight of the medium in total. When the amount of water in a medium is 20% by weight or less, the drying rate of the medium is high, and the production efficiency is high in the drying process of printing ink. When the amount of water in a medium is 2% by weight or more, the dispersion stability or the storage stability is favorable.

The alcohol-based printing ink composition of the present invention may contain an organic solvent except for alcohol (F) in a medium, as needed. Such organic solvent is not limited to the following examples, however, examples of the organic solvent include ketones such as acetone, and methyl ethyl ketone; esters such as ethyl acetate, and propyl acetate; and carbonates such as dimethyl carbonate.

The used amount of the organic solvent except for alcohol (F) is preferably used in a minimum amount, from the viewpoints of the storage stability of ink and the environmental protection or the safety. More preferably, the organic solvent except for alcohol (F) is not used. In the present invention, the medium preferably consists of only water and alcohol (F).

The medium is contained at a ratio of preferably 20 to 98% by weight, and more preferably 45 to 92% by weight, relative to the total weight of printing ink, from the viewpoint of the dispersion stability of pigment.

Next, a dispersant (H) is explained.

The alcohol-based printing ink composition of the present invention may contain a dispersant (H).

A dispersant (H) is not particularly limited as long as the dispersant (H) is a comb-type dispersant having a styrene skeleton in the main chain thereof, and a polyalkylene oxide chain (G) in the side chain thereof, and examples of the dispersant (H) include a polyalkylene oxide monoamine (I) modified product of a styrene-maleic anhydride copolymer, and a copolymer of a compound (J) having a polyalkylene oxide skeleton and one radical polymerizable unsaturated group in the molecule thereof and styrene.

The polyalkylene oxide monoamine (I) is not limited to the following examples, however, examples of the polyalkylene oxide monoamine (I) include Jeffamine (trademark) M600 manufactured by Huntsman, Jeffamine (trademark) M1000 manufactured by Huntsman, Jeffamine (trademark) M2005 manufactured by Huntsman, and Jeffamine (trademark) M2070 manufactured by Huntsman.

The compound (J) having a polyalkylene oxide skeleton and one radical polymerizable unsaturated group in the molecule thereof is not limited to the following examples, however, examples of the compound (J) include polyalkylene glycol mono(meth)acrylates (J1) such as polyethylene glycol mono(meth)acrylate [the "polyethylene glycol mono (meth) acrylate" includes "polyethylene glycol monoacrylate" and "polyethylene glycol monomethacrylate", hereafter the same applies], polypropylene glycol mono (meth) acrylate, poly (ethylene glycol-polypropylene glycol) mono (meth)acrylate, and poly (propylene glycol-tetramethylene glycol) mono (meth)acrylate;

alkoxy polyalkylene glycol mono (meth) acrylates (J2) such as methoxy polyethylene glycol mono (meth) acrylate, in which the terminal hydroxyl group of the polyalkylene glycol mono (meth)acrylates (J1) is etherified with a C1 to C4 hydrocarbon; and further a reactant of: a monofunctional (meth) acrylic monomer having one isocyanate group in the molecule thereof such as 2-(meth) acryloyl oxy ethyl isocyanate or a monofunctional vinyl monomer having one isocyanate group in the molecule thereof such as α,α-dimethyl-4-isopropenyl benzyl isocyanate; and a compound having one reactive active hydrogen group and a polyalkylene oxide group in the molecule thereof such as polyalkylene oxide monoamine (I).

The structure of a polyalkylene oxide chain (G) is not particularly limited, however, from the viewpoints of the pigment dispersibility in alcohol and the compatibility with a polyurethane urea resin (D), a structure containing the propylene oxide unit and/or ethylene oxide unit represented by the following general formula (1) is preferred. In the general formula (1), a ratio of the number of repetition of the propylene oxide unit, n and the number of repetition of the ethylene oxide unit, m is preferably in the range of n:m=100:0 to 75:25. Such a polyalkylene oxide chain (G) can be used alone, or by mixing 2 kinds or more thereof that have different ratios from each other.

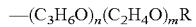

—$(C_3H_6O)_n(C_2H_4O)_mR$            General formula (1)

(in the formula, R is H, or a hydrocarbon group having 1 to 4 carbon atoms, and each of n and m is an integer of 0 to 50 [provided that n and m are 9 to 50 in total]).

As to the ratio of the styrene and the polyalkylene oxide chain (G) in a dispersant (H), from the viewpoints of the pigment dispersibility in alcohol and the solubility in alcohol, the mole ratio of the styrene unit and the polyalkylene oxide chain (G) unit is preferably 2:1 to 10:1. When the ratio of the styrene unit is 10:1 or less, the solubility of dispersant in alcohol (F) is favorable, and when the ratio of the styrene unit is 2:1 or more, the adsorption ability of dispersant to pigment is favorable, and the pigment dispersibility is excellent.

A dispersant (H) can be used by introducing a polar functional group such as an amino group, a carboxyl group, and a hydroxyl group into the molecule, as needed, for the purpose of the improvement of the compatibility with a polyurethane urea resin (D), the dispersion stability, and the like. Further, a dispersant (H) can also be used by salifying with monofunctional carboxylic acid when the dispersant (H) has an amino group in the molecule thereof, or with monofunctional amine, a metal ion, or the like when the dispersant (H) has a carboxyl group in the molecule thereof, respectively.

When a dispersant (H) is used, from the viewpoints of the compatibility with polyurethane urea resin (D), the dispersion stability, and the blocking resistance of printed materials, the dispersant (H) is contained at a ratio of preferably 0.1 to 20% by weight, and more preferably 0.5 to 10% by weight, relative to the total weight of printing ink.

The alcohol-based printing ink composition of the present invention can be obtained by the mixture of a polyurethane urea resin (D), a medium, a coloring agent (E), and a dispersant (H) as needed, and by a pigment dispersion treatment using a disperser such as a sand mill.

The pigment dispersion treatment may be performed at a concentration at which the printing can be performed as it is, however, from the viewpoints of the dispersibility of pigment, the chromogenic, and the production efficiency, in 100% by weight of the pigment dispersion in total, preferably at a concentration of the coloring agent (E) of 10 to 70% by weight, and more preferably at a concentration of the coloring agent (E) of 20 to 50% by weight. After the pigment dispersion treatment, the resultant is diluted with a resin, a medium and the like to the concentration at which the resultant can be easily kept for a long period.

In the preparation of the alcohol-based printing ink composition of the present invention, various kinds of additives, for example, a pigment derivative, a wetting agent, a leveling agent, an antifoaming agent, an antistatic agent, an antiblocking agent, and the like can be used, as needed.

The alcohol-based printing ink composition of the present invention can be used by a known printing method such as gravure printing, and flexo printing.

EXAMPLES

Hereinafter, according to Examples, the present invention is further specifically explained, however, the following Examples do not limit the scope of the present invention at all. Herein, "part" and "%" represent "part by weight" and "% by weight", respectively in Examples.

In addition, the measurement methods of "resin solid concentration", "viscosity", "amine value", "weight average molecular weight", and "acid value" in Examples are as follows.

Resin solid concentration: in accordance with JIS K5601-1-2, the heating residue when measured at a heating temperature of 150° C. for 20 minutes of heating time was expressed as resin solid concentration (%).

Viscosity: measured at 25° C. by using an E-type viscometer.

Amine value: around 3 g of polyurethane urea resin solution was weighed in a flask, dissolved by the addition of 50 ml of methanol, and the mixture was titrated by a potentiometric titration using 0.1 mol/l of hydrochloric acid standard solution, and the amine value was calculated from the obtained neutralization point by the following formula.

Amine value=$a \times f \times 5.61/(s \times w)$ a: used amount of 0.1 mol/l of hydrochloric acid solution (ml)
f: titer of 0.1 mol/l of hydrochloric acid solution
s: polyurethane urea resin solution (g)
w: resin solid concentration (%)

Weight average molecular weight: as a pretreatment, all the amino groups at both terminals of a polyurethane urea resin were reacted with α,α-dimethyl-3-isopropenyl benzyl isocyanate, and then by using TSKgel Super HM-M, or TSKgel Super HM-L (manufactured by TOSOH CORPORATION) as a column, the polystyrene conversion molecular weight when THF was used as an eluent with GPC(HPC-8020 manufactured by TOSOH CORPORATION) equipped with a RI detector was used.

Acid value: measured in accordance with JIS K0070.

Synthesis Example 1

Preparation of Polyurethane Urea Resin (D-1)

Into a flask equipped with a stirrer, a thermometer, a reflux condenser, and a nitrogen gas inlet tube, 33.5 parts of a polycondensate of adipic acid and 3-methy-1,5-pentanediol (hydroxyl value: 56.1 mgKOH/g, and number average molecular weight: 2000), 33.5 parts of polypropylene glycol (hydroxyl value: 56.1 mgKOH/g, and number average molecular weight: 2000), 4.6 parts of 1,3-propanediol, and 41.6 parts of isophorone diisocyanate were charged, and reacted at 90° C. for 6 hours under a nitrogen gas flow to produce a urethane prepolymer. Next, into the obtained urethane prepolymer, 48.5 parts of tertiary butyl alcohol was added to prepare a homogeneous solution of urethane prepolymer. Next, the urethane prepolymer solution was added to a mixture consisting of 17.2 parts of isophoronediamine and 342.4 parts of ethanol dropwise over one hour, and then the resultant was reacted for one hour to obtain a solution of polyurethane urea resin (D-1). The obtained solution of polyurethane urea resin (D-1) had a resin solid concentration of 25% by weight, a viscosity of 170 mPa·s (25° C.), an amine value of resin solid of 6.5 mgKOH/g resin, and a weight average molecular weight of 22,000.

Synthesis Example 2

Preparation of Polyurethane Urea Resin (D-2)

Into a flask equipped with a stirrer, a thermometer, a reflux condenser, and a nitrogen gas inlet tube, 40.5 parts of castor oil polyol (product name: "URIC H1824" manufactured by ITOH OIL CHEMICALS CO., LTD., hydroxyl value: 71.2 mgKOH/g, average number of functional groups: 2, and number average molecular weight: 1576), 27.0 parts of polypropylene glycol (hydroxyl value: 56.1 mgKOH/g, and number average molecular weight: 2000), 4.1 parts of 1,3-propanediol, and 41.6 parts of isophorone diisocyanate were charged, and reacted at 90° C. for 6 hours under a nitrogen gas flow, to produce a urethane prepolymer. Next, into the obtained urethane prepolymer, 48.5 parts of tertiary butyl alcohol was added to prepare a homogeneous solution of urethane prepolymer. Next, into a mixture consisting of 17.4 parts of isophoronediamine and 343.0 parts of ethanol, the urethane prepolymer solution was added dropwise over one hour, and then the resultant was reacted for one hour to obtain a solution of polyurethane urea resin (D-2). The obtained solution of polyurethane urea resin (D-2) had a resin solid concentration of 25% by weight, a viscosity of 125 mPa·s (25° C.), an amine value of resin solid of 7.0 mgKOH/g resin, and a weight average molecular weight of 18,000.

Synthesis Example 3

Preparation of Polyurethane Urea Resin (K-1)

Into a flask equipped with a stirrer, a thermometer, a reflux condenser, and a nitrogen gas inlet tube, 67.7 parts of castor oil polyol (product name: "URIC H-1824" manufactured by ITOH OIL CHEMICALS CO., LTD., hydroxyl value: 71.2 mgKOH/g, average number of functional groups: 2, and number average molecular weight: 1576), 3.9 parts of 1,3-propanediol, and 41.6 parts of isophorone diisocyanate were charged, and reacted at 90° C. for 6 hours under a nitrogen gas flow, to produce a urethane prepolymer. Next, into the obtained urethane prepolymer, 48.5 parts of tertiary butyl alcohol was added to prepare a homogeneous solution of urethane prepolymer. Next, into a mixture consisting of 17.1 parts of isophoronediamine and 342.4 parts of ethanol, the urethane prepolymer solution was added dropwise over one hour, and then the resultant was reacted for one hour to obtain a solution of polyurethane urea resin (K-1). The obtained solution of polyurethane urea resin (K-1) had a resin solid concentration of 25% by weight, a viscosity of 260 mPa·s (25° C.), an amine value of resin solid of 6.2 mgKOH/g resin, and a weight average molecular weight of 18,000.

Synthesis Example 4

Preparation of Polyurethane Urea Resin (K-2)

The procedure was performed in the same manner as in Synthesis Example 1 except that 33.5 parts of a polycondensate of adipic acid and 3-methy-1,5-pentanediol was changed to 33.5 parts of polypropylene glycol (hydroxyl value: 56.1 mgKOH/g, and number average molecular weight: 2000). The obtained solution of polyurethane urea resin (K-2) had a resin solid concentration of 25% by weight, a viscosity of 90 mPa·s (25° C.), an amine value of resin solid of 6.4 mgKOH/g resin, and a weight average molecular weight of 20,000.

Synthesis Example 5

Preparation of Dispersant (H-1)

Into a flask equipped with a stirrer, a thermometer, a reflux condenser, and a nitrogen gas inlet tube, 149 parts of polyalkylene oxide monoamine (product name: "Jeffamine M600" manufactured by Huntsman, number average molecular weight: 568, solid: 100%, and n=9, m=1, and R=$CH_3$ in general formula (1)), and 82 parts of a styrene-maleic anhydride copolymer (product name: "SMA 2000" manufactured by SARTOMER Company Inc., acid value: 360 mgKOH/g, solid: 100%, and styrene:maleic anhydride ratio=2:1) were charged, and reacted at 150° C. for 8 hours under a nitrogen gas flow, and then 347 parts of ethanol was added to the reaction mixture to prepare a homogeneous solution of dispersant (H-1). The obtained solution of dispersant (H-1) had a resin solid concentration of 40% by weight, an acid value of resin solid is 13.0 mgKOH/g resin, an amine value of 0.1 mgKOH/g resin, and a weight average molecular weight of 25,000.

Synthesis Example 6

Preparation of Dispersant (H-2)

Into a flask equipped with a stirrer, a thermometer, a reflux condenser, and a nitrogen gas inlet tube, 163 parts of polyalkylene oxide monoamine (product name: "Jeffamine M2005" manufactured by Huntsman, number average molecular weight: 1953, solid: 100%, and n=29, m=6, and R=$CH_3$ in general formula (1)), and 60 parts of a styrene-maleic anhydride copolymer (product name: "SMAEF 60" manufactured by SARTOMER Company Inc., acid value: 156 mgKOH/g, solid: 100%, and styrene:maleic anhydride ratio=6:1) were charged, and reacted at 150° C. for 8 hours under a nitrogen gas flow, and then 334 parts of ethanol was added to the resultant mixture to prepare a homogeneous solution of dispersant (H-2). The obtained solution of dispersant (H-2) had a resin solid concentration of 40% by weight, an acid value of resin solid is 9.0 mgKOH/g resin, an amine value of 0.1 mgKOH/g resin, and a weight average molecular weight of 30,000.

Synthesis Example 7

Preparation of Dispersant (H-3)

Into a flask equipped with a stirrer, a thermometer, a reflux condenser, and a nitrogen gas inlet tube, 145 parts of polyalkylene oxide monoamine (product name: "Jeffamine M2005" manufactured by Huntsman, number average molecular weight: 1953, solid: 100%, and n=29, m=6, and R=$CH_3$ in general formula (1)), 18 parts of polyalkylene oxide monoamine (product name: "Jeffamine M2070" manufactured by Huntsman, number average molecular weight: 1970, solid: 100%, and n=10, m=31, and R=$CH_3$ in general formula (1)), and 60 parts of a styrene-maleic anhydride copolymer (product name: "SMAEF 60" manufactured by SARTOMER Company Inc., solid: 100%, and styrene:maleic anhydride ratio=6:1) were charged, and reacted at 150° C. for 8 hours under a nitrogen gas flow, and then 335 parts of ethanol were added to the resultant mixture to prepare a homogeneous solution of dispersant (H-3). The obtained solution of dispersant (H-3) had a resin solid concentration of 40% by weight, an acid value of resin solid is 14.0 mgKOH/g resin, an amine value of 0.1 mgKOH/g resin, and a weight average molecular weight of 29,000.

Synthesis Example 8

Preparation of Dispersant (H-4)

Into a flask equipped with a stirrer, a thermometer, a reflux condenser, and a nitrogen gas inlet tube, 131 parts of polyalkylene oxide monoamine (product name: "Jeffamine M2005" manufactured by Huntsman, number average molecular weight: 1953, solid: 100%, and n=29, m=6, and R=$CH_3$ in general formula (1)), 32 parts of polyalkylene oxide monoamine (product name: "Jeffamine M2070" manufactured by Huntsman, number average molecular weight: 1970, solid: 100%, and n=10, m=31, and R=$CH_3$ in general formula (1)), and 60 parts of a styrene-maleic anhydride copolymer (product name: "SMAEF 60" manufactured by SARTOMER Company Inc., solid: 100%, and styrene:maleic anhydride ratio=6:1) were charged, and reacted at 150° C. for 8 hours under a nitrogen gas flow, and then 335 parts of ethanol was added to the resultant mixture to prepare a homogeneous solution of dispersant (H-4). The obtained solution of dispersant (H-4) had a resin solid concentration of 40% by weight, an acid value of resin solid is 15.0 mgKOH/g resin, an amine value of 0.1 mgKOH/g resin, and a weight average molecular weight of 29,000.

Synthesis Example 9

Preparation of Dispersant (H-5)

Into a flask equipped with a stirrer, a thermometer, a reflux condenser, and a nitrogen gas inlet tube, 164 parts of polyalkylene oxide monoamine (product name: "Jeffamine M2070" manufactured by Huntsman, number average molecular weight: 1970, solid: 100%, and n=10, m=31, and R=$CH_3$ in general formula (1)), and 60 parts of a styrene-maleic anhydride copolymer (product name: "SMAEF 60" manufactured by SARTOMER Company Inc., acid value: 156 mgKOH/g, solid: 100%, and styrene:maleic anhydride ratio=6:1) were charged, and reacted at 150° C. for 8 hours under a nitrogen gas flow, and then 337 parts of ethanol was added to the resultant mixture to prepare a homogeneous solution of dispersant (H-5). The obtained solution of dispersant (H-5) had a resin solid concentration of 40% by weight, an acid value of resin solid is 10.0 mgKOH/g resin, an amine value of 0.1 mgKOH/g resin, and a weight average molecular weight of 30,000.

Synthesis Example 10

Preparation of a Compound (J) Having a Polyalkylene Oxide Skeleton and One Radical Polymerizable Unsaturated Group in the Molecule Thereof Into a flask equipped with a stirrer, a thermometer, a reflux condenser, and a nitrogen gas inlet tube, 400 parts of polyalkylene oxide monoamine (product name: "Jeffamine M2005" manufactured by Huntsman, number average molecular weight: 1953, solid: 100%, and n=29, m=6, and R=$CH_3$ in general formula (1)) were charged, and added with 41 parts of α,α-dimethyl-4-isopropenyl benzyl isocyanate dropwise over one hour from a driptank at 40° C. under a nitrogen gas flow, and then the resultant mixture was reacted at 40° C. for 2 hours to obtain a reaction product (J-1).

Synthesis Example 11

Preparation of Dispersant (H-6)

Into a flask equipped with a stirrer, a thermometer, a reflux condenser, and a nitrogen gas inlet tube, 56 parts of ethanol were charged, the temperature was raised to 80° C., and the reaction vessel was purged with nitrogen. After that, from a driptank, a mixture in which 29 parts of styrene, 1.7 parts of acrylic acid, 100 parts of the reaction product (J-1), and 4.0 parts of dimethyl 2,2'-azobis(2-methyl propionate) had been homogeneously mixed in advance was added dropwise over two hours, and then the resultant mixture was reacted at 80° C. for 8 hours, and further added with 145 parts of ethanol to prepare a homogeneous solution of dispersant (H-6). The obtained solution of dispersant (H-6) had a resin solid concentration of 40% by weight, an acid value of resin solid is 10 mgKOH/g resin, an amine value of 0.1 mgKOH/g resin, and a weight average molecular weight of 40,000.

The content of the polyurethane urea resin solution obtained above is shown in Table 1, and the content of the dispersant solution is shown in Table 2.

TABLE 1

| | Polyol (A) | | |
|---|---|---|---|
| | A1 component | A2 component | Other components |
| D-1 | PPG | MPD/AA | PDO |
| D-2 | PPG | Castor oil polyol | PDO |
| K-1 | Non | Castor oil polyol | PDO |
| K-2 | PPG | Non | PDO |

PPG: polypropylene glycol
MPD: 3-methyl-1,5-pentanediol
AA: adipic acid
PDO: 1,3-propanediol

TABLE 2

| | | Side chain | | | |
|---|---|---|---|---|---|
| Main chain | Constituent | PO unit n number (average) | EO unit m number (average) | PO unit/EO unit = n:m (average) | Terminal group R |
| H-1 | St/MAH | PO unit/EO unit | 9 | 1 | 90:10 | $CH_3$ |
| H-2 | St/MAH | PO unit/EO unit | 29 | 6 | 83:17 | $CH_3$ |
| H-3 | St/MAH | PO unit/EO unit | 27 | 9 | 75:25 | $CH_3$ |
| H-4 | St/MAH | PO unit/EO unit | 25 | 11 | 70:30 | $CH_3$ |
| H-5 | St/MAH | PO unit/EO unit | 10 | 31 | 24:76 | $CH_3$ |
| H-6 | St/AA | PO unit/EO unit | 29 | 6 | 83:17 | $CH_3$ |

St: styrene
MAH: maleic anhydride
AA: acrylic acid
PO: propylene oxide
EO: ethylene oxide Examples 1 to 20 and Comparative Examples 1 to 7

Preparation of Printing Ink

Formulation of each printing ink is shown in Table 3.
First, relative to 10 parts by weight of coloring agent (E), a solution of polyurethane urea resin (D) or (K) obtained in Synthesis Examples 1 to 4, a solution of dispersant (H) obtained in Synthesis Examples 5 to 11, water, and ethanol were mixed to be 16 parts by weight, 0 part by weight, 5 parts by weight, and 9 parts by weight, respectively, when the dispersant (H) was not used, and to be 0 part by weight, 10 parts by weight, 5 parts by weight, and 15 parts by weight, respectively, when the dispersant (H) was used. Next, the resultant mixture was dispersed by using a horizontal sand mill, and then mixed with the remaining components so as to be the mixing ratios (parts by weight) of Table 3 to adjust printing ink.

Preparation of Printed Materials 100 parts by weight of the obtained printing ink was diluted with 50 parts by weight of ethanol, and then the diluted printing ink was applied by a bar coater No. 4 to print a treated surface of a one-side corona discharge treatment oriented polypropylene film having a thickness of 20 µm, and the printed ink was dried at 50° C. for 30 seconds to obtain printed materials.

Evaluation of Printing Ink and Printed Materials

The following tests for the printing ink and the obtained printed materials were performed. The results are shown in Table 3.

(1) Dispersibility

The presence or absence of separation and precipitation/aggregates of the printing ink immediately after the preparation were determined by the following evaluation criteria.
○: Separation and precipitation/aggregates were not generated.
X: Separation and precipitation/aggregates were generated.

(2) High-Temperature Storage Stability of Printing Ink

Printing ink was stored at 40° C. for one week, and then was determined by the following evaluation criteria according to the rate of change in viscosity before and after the test. The measurement of the viscosity was performed at 25° C. by using a B-type rotational viscometer.
○: The rate of change in viscosity is less than 5%.
Δ: The rate of change in viscosity is 5% or more to less than 15%.
X: The rate of change in viscosity is 15% or more.

(3) Low-Temperature Storage Stability of Printing Ink

Printing ink was stored at −10° C. for one week, and then was determined by the following evaluation criteria according to the rate of change in viscosity before and after the test. The measurement of the viscosity was performed at 25° C. by using a B-type rotational viscometer.
○: The rate of change in viscosity is less than 5%.
Δ: The rate of change in viscosity is 5% or more to less than 15%.
X: The rate of change in viscosity is 15% or more.

(4) Haze of Printed Materials

The haze value of printed materials was measured by using Haze meter 300A (manufactured by Tokyo Denshoku CO., LTD.).

(5) Adhesion

Cellophane tape (width 12 mm) was put on the printed surface of printed materials, and then the state of the printed surface when the tape was peeled off sharply in the vertical direction was determined by the following evaluation criteria.
○: The remainder of ink is 90% by area or more.
Δ: The remainder of ink is 70% by area or more to less than 90% by area.
X: The remainder of ink is less than 70% by area.

(6) Blocking Resistance of the Printed Materials

A printed surface and a non-printed surface of printed materials were overlaid with each other, and were loaded at 10.0 kg/cm² under conditions of the temperature of 40° C. and the relative humidity of 80%, and 24 hours later, were peeled off, and then each surface state was determined by the following evaluation criteria.

◯: The transition of ink from the printed surface to the non-printed surface was not observed at all.

Δ: The transition of ink from the printed surface to the non-printed surface was observed in less than 10% by area.

X: The transition of ink from the printed surface to the non-printed surface was observed in 10% by area or more.

(7) Drying Rate

By using the relationship between the blocking resistance of printed materials and the drying time, the drying rate was determined by the following evaluation criteria.

◯: Even when the drying time was changed from 30 seconds to 60 seconds, change in the blocking resistance was not observed.

Δ: When the drying time was changed from 30 seconds to 60 seconds, the transition from the printed surface to the non-printed surface was improved.

(8) Comprehensive Evaluation

According to the results of evaluation items (1) to (7), the comprehensive evaluation was determined by the following evaluation criteria.

⊙: Performance is particularly excellent.

◯: Performance is sufficient.

Δ: Practical level, although the use environment, application, and the like are limited.

X: Not in the level for use.

TABLE 3

| | | | Examples | | | | | | | | | | | | | | |
|---|---|---|---|---|---|---|---|---|---|---|---|---|---|---|---|---|---|
| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
| Formulation | Polyurethane urea resin (D) solution, and the like | D-1 | 52 | | 48 | 48 | 48 | 48 | 48 | 48 | 48 | | | | | | |
| | | D-2 | | 52 | | | | | | | | 48 | 48 | 48 | 48 | 48 | 48 |
| | | K-1 | | | | | | | | | | | | | | | |
| | | K-2 | | | | | | | | | | | | | | | |
| | Dispersant (H) solution | H-1 | | | 10 | | | | | | | 10 | | | | | |
| | | H-2 | | | | 10 | | | | | | | 10 | | | | |
| | | H-3 | | | | | 10 | | | | | | | 10 | | | |
| | | H-4 | | | | | | 10 | | | | | | | 10 | | |
| | | H-5 | | | | | | | 10 | | | | | | | 10 | |
| | | H-6 | | | | | | | | 10 | | | | | | | 10 |
| | Coloring agent (E) | Indigo blue pigment (C.I. Pigment Blue 15:3) | 10 | 10 | 10 | 10 | 10 | 10 | 10 | 10 | 10 | 10 | 10 | 10 | 10 | 10 |
| | | Yellow pigment (C.I. Pigment Yellow 14) | | | | | | | | | | | | | | | |
| | | Red pigment (C.I. Pigment Red 57:1) | | | | | | | | | | | | | | | |
| | | Black pigment (C.I. Pigment Black 7) | | | | | | | | | | | | | | | |
| | Medium | Water | 5 | 5 | 5 | 5 | 5 | 5 | 5 | 5 | 5 | 5 | 5 | 5 | 5 | 5 |
| | | Ethanol | 33 | 33 | 27 | 27 | 27 | 27 | 27 | 27 | 27 | 27 | 27 | 27 | 27 | 27 |
| | | Isopropanol | 0 | 0 | 0 | 0 | 0 | 0 | 0 | 0 | 0 | 0 | 0 | 0 | 0 | 0 |
| | | Ethyl acetate | 0 | 0 | 0 | 0 | 0 | 0 | 0 | 0 | 0 | 0 | 0 | 0 | 0 | 0 |
| | | (Alcohol ratio in the whole medium: %) | 94 | 94 | 93 | 93 | 93 | 93 | 93 | 93 | 93 | 93 | 93 | 93 | 93 | 93 |
| | | (Amount of moisture in the whole medium: %) | 6 | 6 | 7 | 7 | 7 | 7 | 7 | 7 | 7 | 7 | 7 | 7 | 7 | 7 |
| | | (Ethanol ratio in the alcohol: %) | 93 | 93 | 94 | 94 | 94 | 94 | 94 | 94 | 94 | 94 | 94 | 94 | 94 | 94 |
| Evaluation | (1) Dispersibility | | ◯ | ◯ | ◯ | ◯ | ◯ | ◯ | ◯ | ◯ | ◯ | ◯ | ◯ | ◯ | ◯ | ◯ |
| | (2) High-temperature storage stability | | Δ | ◯ | Δ | Δ | Δ | Δ | Δ | Δ | ◯ | ◯ | ◯ | ◯ | ◯ | ◯ |
| | (3) Low-temperature storage stability | | ◯ | ◯ | ◯ | ◯ | ◯ | ◯ | ◯ | ◯ | ◯ | ◯ | ◯ | ◯ | ◯ | ◯ |
| | (4) Haze | | 26 | 14 | 19 | 17 | 19 | 21 | 24 | 17 | 6 | 6 | 8 | 11 | 12 | 6 |
| | (5) Adhesion | | ◯ | ◯ | ◯ | ◯ | ◯ | ◯ | ◯ | ◯ | ◯ | ◯ | ◯ | ◯ | ◯ | ◯ |
| | (6) Blocking resistance | | ◯ | ◯ | ◯ | ◯ | ◯ | ◯ | ◯ | ◯ | ◯ | ◯ | ◯ | ◯ | ◯ | ◯ |
| | (7) Drying rate | | ◯ | ◯ | ◯ | ◯ | ◯ | ◯ | ◯ | ◯ | ◯ | ◯ | ◯ | ◯ | ◯ | ◯ |
| | (8) Comprehensive evaluation | | Δ | ◯ | Δ | Δ | Δ | Δ | Δ | Δ | ⊙ | ⊙ | ⊙ | ◯ | ◯ | ⊙ |

| | | | Examples, Comparative Examples | | | | | | | | | | | |
|---|---|---|---|---|---|---|---|---|---|---|---|---|---|
| | | | Ex. 15 | Ex. 16 | Ex. 17 | Ex. 18 | Ex. 19 | Ex. 20 | Com. Ex. 1 | Com. Ex. 2 | Com. Ex. 3 | Com. Ex. 4 | Com. Ex. 5 | Com. Ex. 6 | Com. Ex. 7 |
| Formulation | Polyurethane urea resin | D-1 | | | | | | | | | | | 52 | | |
| | | D-2 | 48 | 48 | 48 | 48 | 48 | 48 | | | | | | 52 | 52 |

TABLE 3-continued

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| (D) solution, and the like | K-1 | | | | | | | 52 | | 48 | | | | |
| | K-2 | | | | | | | | 52 | | 48 | | | |
| Dispersant (H) solution | H-1 | | | | | | | | | | | | | |
| | H-2 | 10 | 10 | 10 | 10 | 10 | 10 | | | 10 | 10 | | | |
| | H-3 | | | | | | | | | | | | | |
| | H-4 | | | | | | | | | | | | | |
| | H-5 | | | | | | | | | | | | | |
| | H-6 | | | | | | | | | | | | | |
| Coloring agent (E) | Indigo blue pigment (C.I. Pigment Blue 15:3) | 10 | 10 | 10 | | | | 10 | 10 | 10 | 10 | 10 | 10 | 10 |
| | Yellow pigment (C.I. Pigment Yellow 14) | | | | 10 | | | | | | | | | |
| | Red pigment (C.I. Pigment Red 57:1) | | | | | 10 | | | | | | | | |
| | Black pigment (C.I. Pigment Black 7) | | | | | | 10 | | | | | | | |
| Medium | Water | 14 | 5 | 5 | 5 | 3 | 5 | 5 | 5 | 5 | 5 | 5 | 0 | 0 |
| | Ethanol | 19 | 12 | 15 | 27 | 29 | 27 | 33 | 33 | 27 | 27 | 10 | 38 | 38 |
| | Isopropanol | 0 | 14 | 0 | 0 | 0 | 0 | 0 | 0 | 0 | 0 | 0 | 0 | 0 |
| | Ethyl acetate | 0 | 0 | 12 | 0 | 0 | 0 | 0 | 0 | 0 | 0 | 17 | 0 | 0 |
| | (Alcohol ratio in the whole medium: %) | 81 | 93 | 77 | 93 | 96 | 93 | 94 | 94 | 93 | 93 | 70 | 100 | 100 |
| | (Amount of moisture in the whole medium: %) | 19 | 7 | 7 | 7 | 4 | 7 | 6 | 6 | 7 | 7 | 7 | 0 | 0 |
| | (Ethanol ratio in the alcohol: %) | 93 | 73 | 92 | 94 | 94 | 94 | 93 | 93 | 93 | 93 | 91 | 94 | 94 |
| Evaluation | (1) Dispersibility | ○ | ○ | ○ | ○ | ○ | ○ | X | X | X | ○ | ○ | ○ | ○ |
| | (2) High-temperature storage stability | ○ | ○ | △ | ○ | ○ | ○ | — | — | — | X | X | X | X |
| | (3) Low-temperature storage stability | ○ | ○ | ○ | ○ | ○ | ○ | — | — | — | X | X | X | X |
| | (4) Haze | 13 | 7 | 19 | 58 | 40 | 21 | — | — | — | 19 | 19 | 22 | 14 |
| | (5) Adhesion | ○ | ○ | ○ | ○ | ○ | ○ | — | — | — | ○ | ○ | ○ | ○ |
| | (6) Blocking resistance | △ | ○ | ○ | ○ | ○ | ○ | — | — | — | X | ○ | ○ | ○ |
| | (7) Drying rate | △ | ○ | ○ | ○ | ○ | ○ | — | — | — | ○ | ○ | ○ | ○ |
| | (8) Comprehensive evaluation | △ | ⊙ | △ | ⊙ | ⊙ | ⊙ | X | X | X | X | X | X | X |

As to the Comparative Examples 1 to 3 in which the initial dispersibility is poor, evaluations of (2) to (7) were not performed.

The invention claimed is:

1. An alcohol-comprising printing ink composition, comprising:
    a polyurethane urea resin (D) obtained by reacting a polyol (A) comprising a polyether polyol (A1) and a polyester polyol (A2), a diisocyanate (B), and a chain extender (C), wherein the polyester polyol (A2) is a castor oil fatty acid polymer;
    a coloring agent (E); and
    a medium comprising an alcohol (F) and water,
    wherein the medium comprises 75% by weight or more of the alcohol (F).

2. The alcohol-comprising printing ink composition of claim 1, wherein the medium consists of water and alcohol (F).

3. The alcohol-comprising printing ink composition of claim 1, wherein the alcohol (F) comprises 70% by weight or more of ethanol and/or isopropanol.

4. The alcohol-comprising printing ink composition of claim 1, wherein the medium comprises 2 to 20% by weight of water.

5. The alcohol-comprising printing ink composition of claim 1, wherein the amount of the polyether polyol (A1) is in the range of 35 to 75% by weight, and the amount of the polyester polyol (A2) is in the range of 25 to 65% by weight, based on 100% by weight of the polyol (A).

6. The alcohol-comprising printing ink composition of claim 1, further comprising:
    a comb-type dispersant (H) comprising a styrene skeleton in a main chain and a polyalkylene oxide chain (G) in a side chain.

7. The alcohol-comprising printing ink composition of claim 6, wherein the polyalkylene oxide chain (G) has a structure comprising a unit selected from the group consisting of a propylene oxide unit and an ethylene oxide unit, and is represented by formula (1):

$$-(C_3H_6O)_n(C_2H_4O)_mR \quad (1),$$

wherein:

R is H or a hydrocarbon group comprising 1 to 4 carbon atoms; and n and m are each independently an integer from 0 to 50, provided that n and m together are an integer from 9 to 50 in total.

8. The alcohol-comprising printing ink composition of claim 7, wherein in formula (1), the ratio of the number of repetition of the propylene oxide unit, n, and the number of repetition of the ethylene oxide unit, m, is n:m =100:0 to 75:25.

* * * * *